US012699290B2

(12) United States Patent
Sciancalepore et al.

(10) Patent No.: US 12,699,290 B2
(45) Date of Patent: Aug. 4, 2026

(54) METHOD FOR MANUFACTURING A THERMO-OPTIC COMPONENT

(71) Applicant: Soitec, Bernin (FR)

(72) Inventors: Corrado Sciancalepore, Saint-Martin-le-Vinoux (FR); Bruno Ghyselen, Seyssinet (FR); Alain Delpy, Tullins (FR); Céline Cailler, Gieres (FR); David Herisson, Eybens (FR); Aziz Alamidrissi, Le Touvet (FR)

(73) Assignee: Soitec, Bernin (FR)

( * ) Notice: Subject to any disclaimer, the term of this patent is extended or adjusted under 35 U.S.C. 154(b) by 469 days.

(21) Appl. No.: 18/003,387

(22) PCT Filed: Jun. 22, 2021

(86) PCT No.: PCT/FR2021/051128
§ 371 (c)(1),
(2) Date: Dec. 27, 2022

(87) PCT Pub. No.: WO2022/003270
PCT Pub. Date: Jan. 6, 2022

(65) Prior Publication Data
US 2023/0244095 A1 Aug. 3, 2023

(30) Foreign Application Priority Data

Jun. 29, 2020 (FR) ........................................ 2006801

(51) Int. Cl.
*G02F 1/01* (2006.01)
(52) U.S. Cl.
CPC ............ *G02F 1/0147* (2013.01); *G02F 1/011* (2013.01); *G02F 2202/105* (2013.01)
(58) Field of Classification Search
None
See application file for complete search history.

(56) References Cited

U.S. PATENT DOCUMENTS 6,031,957 A 2/2000 Suzuki et al.
10,416,380 B1 9/2019 Chen et al.
(Continued)

FOREIGN PATENT DOCUMENTS

CN 1659469 A 8/2005
CN 105492944 A 4/2016
(Continued)

OTHER PUBLICATIONS

International Search Report for International Application No. PCT/FR2021/051128 dated Sep. 28, 2021, 3 pages.
(Continued)

*Primary Examiner* — Stephanie P Duclair
(74) *Attorney, Agent, or Firm* — TraskBritt

(57) ABSTRACT

A method for manufacturing a thermo-optic component comprises the following steps:
  a) providing a silicon-on-insulator (SOI) substrate comprising:
    a surface layer made of single-crystal silicon, extending in a main plane and placed on a dielectric layer, itself placed on a carrier made of silicon, and
    at least one buried cavity, which is formed in the carrier and which opens under the dielectric layer,
  b) forming an optical waveguide extending in the main plane and comprising a core formed in the surface layer and encircled by an optical confinement layer including the dielectric layer,
  c) producing at least one heating element, on the optical waveguide, the heating element being positioned, in the main plane, plumb with a segment of the optical waveguide, or on either side of the segment, the heating element and the segment of the optical waveguide being located plumb with the at least one buried cavity.

9 Claims, 3 Drawing Sheets

100

60

50
52'
53
3'
3
2
1 z
y
x

(56) References Cited

U.S. PATENT DOCUMENTS

| | | | |
|---|---|---|---|
| 2005/0169566 A1 | 8/2005 | Takahashi | |
| 2008/0165565 A1 | 7/2008 | Gunter et al. | |
| 2009/0297092 A1 | 12/2009 | Takahashi | |
| 2010/0111461 A1 | 5/2010 | Takahashi et al. | |
| 2013/0058606 A1 | 3/2013 | Thomson et al. | |
| 2015/0253510 A1* | 9/2015 | Celo | G02F 1/225 385/16 |
| 2018/0231714 A1* | 8/2018 | Collins | G02B 6/26 |
| 2019/0293863 A1* | 9/2019 | Zheng | G02B 6/136 |
| 2019/0369328 A1 | 12/2019 | Davies et al. | |

FOREIGN PATENT DOCUMENTS

| | | | |
|---|---|---|---|
| CN | 110383127 A | 10/2019 | |
| CN | 112305785 A | 2/2021 | |
| JP | 2003-084252 A | 3/2003 | |
| JP | 2015-191031 A | 11/2015 | |
| TW | 202021153 A | 6/2020 | |
| WO | 02/44777 A1 | 6/2002 | |
| WO | 2008/111407 A1 | 9/2008 | |

OTHER PUBLICATIONS

International Written Opinion for International Application No. PCT/FR2021/051128 dated Sep. 28, 2021, 6 pages.

Japanese Notice of Reasons for Rejection for Application No. 2022-580331 dated Oct. 30, 2024, 10 pages with English translation.

Taiwanese Office Action and Search Report for Application No. 110123448 dated Feb. 13, 2025, 11 pages with machine translation.

Office Action received for Korean Patent Application No. 10-2023-7001771, mailed on Jan. 17, 2025, 11 pages (6 pages of English Translation and 5 pages of Original Document).

CN Office Action, Including Search report received for Chinese Patent Application No. 202180045734.X, mailed on Dec. 24, 2025, 12 pages (6 pages of English Translation and 6 pages of Original Document).

* cited by examiner

METHOD FOR MANUFACTURING A THERMO-OPTIC COMPONENT

CROSS-REFERENCE TO RELATED APPLICATIONS

This application is a national phase entry under 35 U.S.C. § 371 of International Patent Application PCT/FR2021/051128, filed Jun. 22, 2021, designating the United States of America and published as International Patent Publication WO 2022/003270 A1 on Jan. 6, 2022, which claims the benefit under Article 8 of the Patent Cooperation Treaty to French Patent Application Serial No. FR2006801, filed Jun. 29, 2020.

TECHNICAL FIELD

The present disclosure relates to the field of photonics. It relates, in particular, to a process for fabricating a thermo-optic component, i.e., a component, the optical properties of which (refractive index to the first order) are modified via a local or global variation in temperature, generated by a heat source internal or external to the component.

BACKGROUND

Silicon photonics is increasingly receiving interest because this technology allows optical communication links to be improved via provision of many integrated functionalities, such as switches and optical phase-shifters, modulators, filters, lasers, etc.

Switches and optical phase-shifters, in particular, must be able to efficiently convey a high number of signals while meeting specifications in respect of compactness, low power consumption and high switching speed. Because silicon has a high thermo-optic effect, compact and rapid thermo-optic switches have been able to be developed on silicon-on-insulator (SOI) substrates; mention may especially be made of components such as ring resonators or Mach-Zehnder interferometers.

U.S. Patent Application Publication No. US2015253510 provides a compact thermo-optic switch that greatly minimizes the power required to achieve switching, because an optical waveguide thereof is formed so as to be suspended above the carrier substrate, mainly encircled by air, and attached to the carrier substrate by way of pillars that limit heat flow: the thermal confinement improves the efficiency (limits the power consumption) of the switch. The architecture of this thermo-optic switch is obtained using an SOI substrate. The silicon surface layer and the buried oxide of the SOI substrate form the core of the optical waveguide and one portion of the optical confinement layer around the core, respectively, and a heating element is placed on the waveguide. Steps of structuring and etching, from the front side, the SOI substrate allow deep trenches and an air gap to be formed between the waveguide and the carrier substrate.

One drawback of such an architecture may result from the fact that a plurality of peripheral regions of the thermo-optic component make contact with air. The transient response to temperature variations generated by the heating element will therefore be degraded. In particular, the time required, on stoppage of the heating element, for the waveguide to return to a temperature TO from a higher temperature T1, i.e., the fall time, is increased because of the thermal inertia generated by the surrounding air.

BRIEF SUMMARY

The present disclosure relates to an alternative solution to those known in the prior art. The present disclosure relates to a process for fabricating a thermo-optic component that permits good thermal insulation, favorable to the efficiency of the thermo-optic effect, while preserving a very good transient dynamic component response. The fabrication process also allows the component to be endowed with a high integration density and an excellent mechanical stability, while simplifying the fabricating steps.

The present disclosure relates to a process for fabricating a thermo-optic component comprising the following steps:
a) providing a silicon-on-insulator (SOI) substrate comprising:
a surface layer made of single-crystal silicon, extending in a main plane and placed on a dielectric layer, itself placed on a carrier made of silicon, and
at least one buried cavity, which is formed in the carrier and which opens under the dielectric layer,
b) forming an optical waveguide extending in the main plane and comprising a core formed in the surface layer and encircled by an optical confinement layer including the dielectric layer,
c) producing at least one heating element, on the optical waveguide, the heating element being positioned, in the main plane, plumb with a segment of the optical waveguide, or on either side of the segment, the heating element and the segment of the optical waveguide being located plumb with the at least one buried cavity.

According to some advantageous features of the present disclosure, which may be implemented alone or in any achievable combination:
in step b), an aperture is produced, through the optical waveguide, in order to place the at least one cavity under an exterior pressure;
the aperture is preserved, or plugged so as to hermetically seal the at least one cavity;
the—at least one—cavity remains hermetically sealed throughout steps a), b) and c);
the dielectric layer is made of silicon oxide and has a thickness between 100 nm and 3 microns;
the surface layer has a thickness between 100 nm and 500 nm;
the optical confinement layer comprises an additional dielectric layer having a thickness between 0.5 and 1.5 microns;
the at least one cavity has lateral dimensions, in the main plane, between 10 microns and a few millimeters, and a depth, along an axis normal to the main plane, between a few microns and 100 microns, and advantageously between 5 and 10 microns.

The present disclosure also relates to a thermo-optic component produced using the fabrication process such as above, forming a switch, a phase-shifter, a modulator, a laser emitter, an amplifier, a directional coupler, a filter and/or a multiplexer.

BRIEF DESCRIPTION OF THE DRAWINGS

Other features and advantages of the present disclosure will become apparent from the following detailed description, with reference to the appended figures, in which.

US 12,699,290 B2

3

Figure 4A:
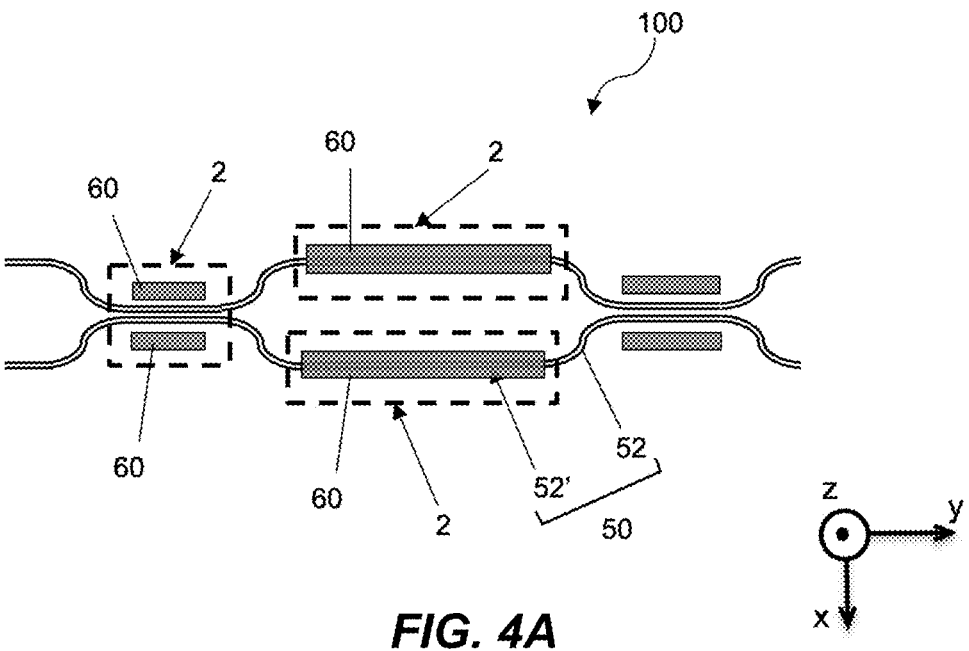
Figure 4B:
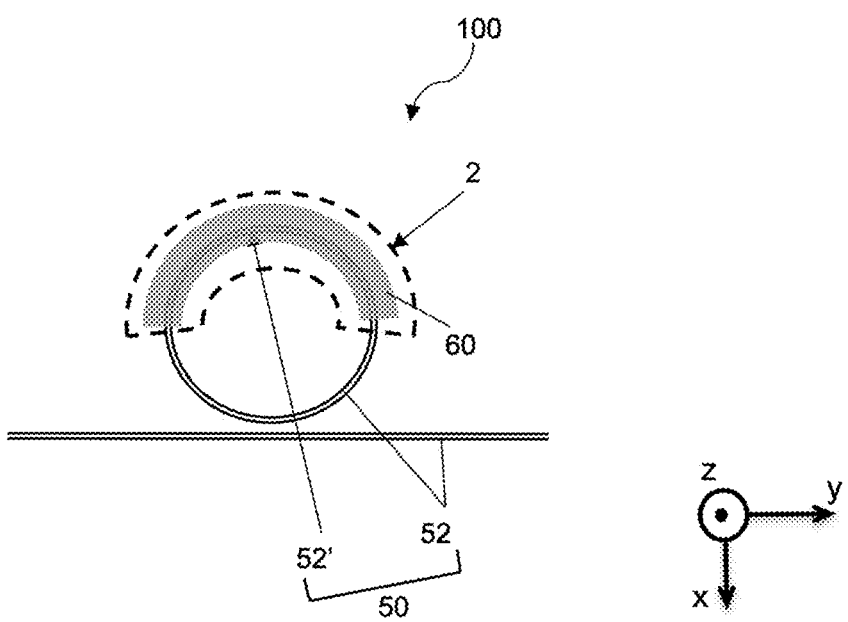

FIGS. 4A and 4B show two architectures, seen from above, of thermo-optic components produced with the fabrication process according to the present disclosure.

The figures are schematic representations that, for the sake of legibility, are not necessarily to scale. In particular, the thicknesses of the layers along the z-axis are not to scale with respect to the lateral dimensions along the x- and y-axes.

In the figures, the same references may be used for elements of the same nature.

The various possibilities (variants and embodiments illustrated and/or detailed in the description below) must be understood as not being exclusive from one another and may be combined together.

DETAILED DESCRIPTION

The present disclosure relates to a fabrication process for fabricating a thermo-optic component. The term "thermo-optic component," as used herein, means any type of opto-electronic device, such as a switch, a phase-shifter, a modulator, a directional coupler, a filter and an optical multiplexer, a laser emitter, an amplifier, etc., the optical properties of which (in particular, its refractive index to the first order) are modified by a local (or global) temperature variation generated by a heat source internal or external to the device.

The fabrication process allows production of an optical waveguide 50 based on single-crystal silicon and a heating element 60, in proximity to a segment of the waveguide 50: the temperature variations generated by the heating element 60 in a segment 52' of the silicon core of the waveguide 50 have the effect of modifying the refractive index of the silicon, thus changing the effective index of the optical mode in the guide 50.

Figure 1A:
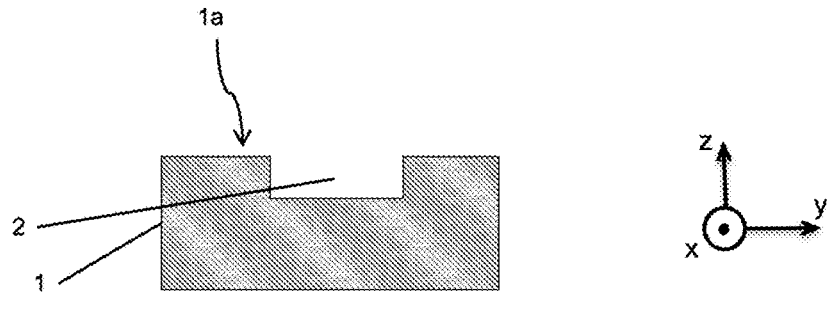
FIGS. 1A-1D show a process sequence for providing the SOI substrate of step a) of the fabrication process according to the present disclosure.
Figure 1B:
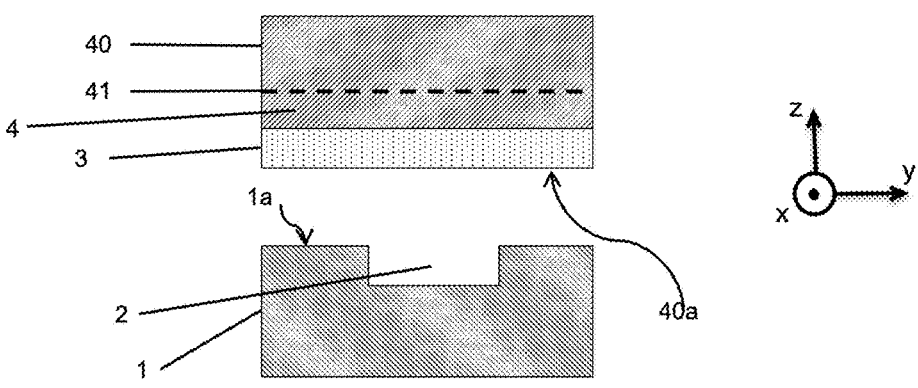
Figure 1C:
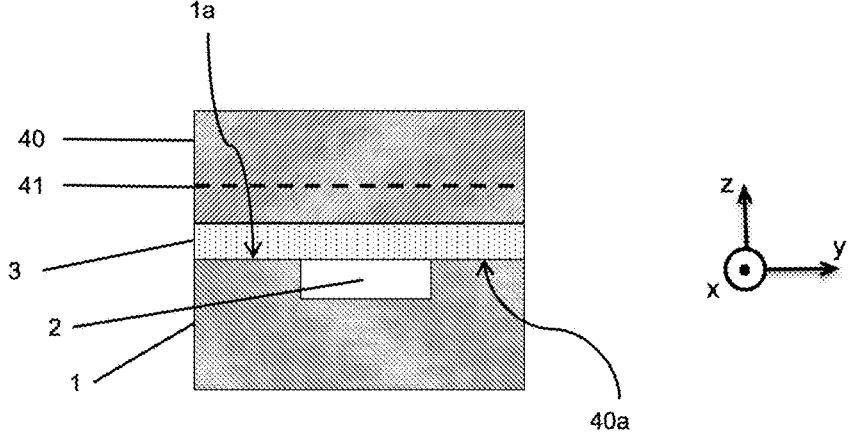
Figure 1D:
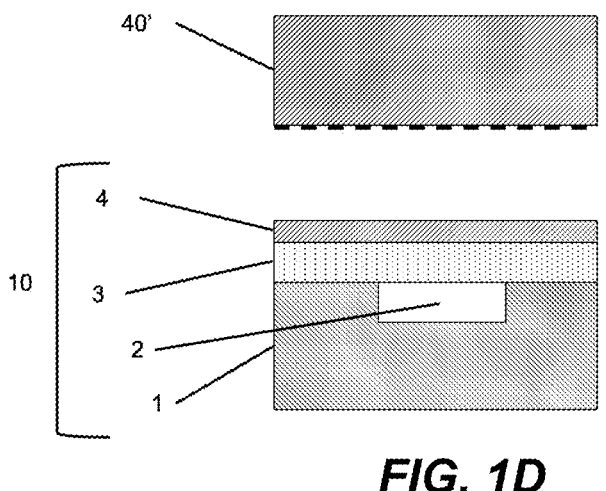
Figure 1D:
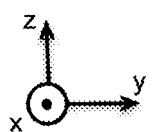

The fabrication process comprises a step a) of providing a silicon-on-insulator (SOI) substrate 10 comprising a surface layer 4 made of single-crystal silicon, extending in a main plane (x, y) and placed on a dielectric layer 3, itself placed on a silicon carrier 1 (FIG. 1D). The SOI substrate 10 preferentially takes the form of a circular wafer having a diameter between 150 mm and 450 mm, the thickness of the carrier 1 typically varying between 300 microns and 1000 microns.

Advantageously, to meet the requirements of photonic applications, the surface layer 4 has a thickness between 100 nm and 500 nm. This surface layer 4 is intended to form the core of an optical waveguide 50.

Again advantageously, but non-limitingly, the dielectric layer 3 is made of silicon oxide and has a thickness between 100 nm and 3 microns.

The SOI substrate 10 further comprises at least one buried cavity 2, which is formed in the carrier 1 and which opens under the dielectric layer 3. Below, for the sake of simplicity, reference will be made to a buried cavity 2, but it will be understood that the SOI substrate 10 advantageously comprises a plurality of cavities 2, which will be distributed in the main plane (x, y) in accordance with the intended device architecture, with the type and with the number of thermo-optic components 100 intended to be provided on the SOI substrate 10. It will also be noted that all the buried cavities 2 do not necessarily have the same dimensions (length and width in the main plane (x, y), and depth along the z-axis normal to the main plane (x, y)), because they may be associated with various architectures or types of component.

The buried cavity 2 may have lateral dimensions, in the main plane (x, y), between 10 microns and a few millimeters, and a depth between a few microns and 100 microns, and advantageously between 5 and 10 microns. It may have any shape in the main plane (x, y), for example, square, rectangular, polygonal, circular, annular, etc.

The buried cavity 2 of the SOI substrate 10 may be filled with a sacrificial solid material or be devoid thereof. In the latter case, it may be filled with air or with gas at atmospheric pressure or at a determined controlled pressure.

By way of example, the sacrificial material will possibly be chosen from silicon oxide, for example, low-density or doped silicon oxide, doped polysilicon, porous silicon, etc. The sacrificial material will optionally have an etch rate with respect to the other materials of the SOI substrate 10, namely with respect to the thermal silicon oxide and to the single-crystal silicon, that is high enough to avoid significant etching of the substrate 10 when this sacrificial material is removed subsequently in the process.

The production of such an SOI substrate 10 with buried cavity 2 is preferably based on the thin-layer-transfer process known as the SmartCut™ process.

Prior to the transfer of the surface layer 4, the carrier 1 used is a single-crystal silicon substrate the front side 1a of which has been etched to form the at least one cavity 2 (FIG. 1A). In the variant in which the cavity 2 is filled with a sacrificial material, the material is then deposited in the cavity 2 so as to lie flush with the silicon surface of the front side 1a.

Conventional steps of photolithography, masking, etching, deposition and polishing, which will not be described here, are used to form the cavities, and to fill them if required.

A donor substrate 40 made of single-crystal silicon is implanted via its front side 40a, so as to define a buried weakened plane 41 substantially parallel to the front side 40a and delineating, with the latter, the thin layer 3, 4 to be transferred (FIG. 1B). The implantation is usually done with light species such as hydrogen or helium ions or a combination of these two species. The weakened plane 41 is so named because it comprises nano-cracks in lenticular form generated by the implanted light species.

According to one preferred option, the thin layer 3, 4 to be transferred comprises, from the front side 40a of the donor substrate 40 to the buried weakened plane 41, a dielectric layer 3 and a silicon layer 4, which will form the buried dielectric layer 3 and the silicon surface layer 4 of the SOI substrate 10, respectively. It will therefore be understood that the implantation energy for the light species is chosen and adjusted so as to form the buried weakened plane (relatively localized at the implantation peak) at the depth corresponding to the desired thickness of the surface layer 4, taking into account finishing steps (mentioned below) that consume some of the material of the layer 4.

The donor substrate 40 and the carrier 1 are then joined, by direct bonding between the front sides 40a, 1a of the substrates 40, 1, to form a bonded structure (FIG. 1C). As well known in the field of direct bonding, cleans and/or activations of the surface of the front sides 40a, 1a will possibly be carried out to obtain an excellent quality bond. It is possible for the substrates to be joined under a controlled atmosphere; this especially allows the pressure in the cavities (which are buried subsequent to the joining operation) to be controlled, when the cavities are devoid of sacrificial material.

The cleave in the buried weakened plane 41 preferably results from application of a heat treatment at a moderate temperature, typically between 350° C. and 500° C., because of growth in microcracks via coalescence and pressurization of gaseous species (FIG. 1D). Alternatively or conjointly, the cleave may result from application of a mechanical stress to the bonded structure.

At the end of this cleave, an intermediate SOI substrate and the remainder of the donor substrate 40' are obtained. Finishing sequences comprising cleanings, surface treatments (etching, polishing, etc.) and/or heat treatments are conventionally applied to the intermediate SOI substrate, so as to ensure the silicon surface layer 4 has a good surface finish (roughness and number of defects) and a good crystal quality. Following this, the SOI substrate 10 is available.

Although the production of the SOI substrate 10 with buried cavity 2 has been described here with reference to the SmartCut™ process, such an SOI substrate 10 may also be produced using other thin-layer-transfer processes known in the art.

Figure 2:
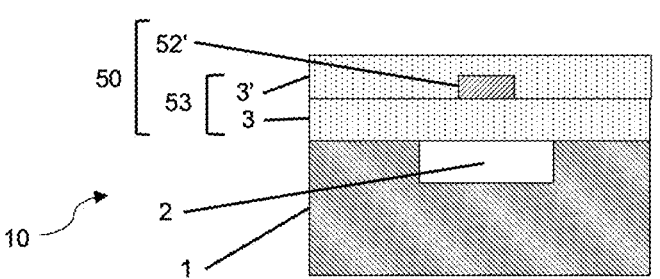
FIG. 2 shows step b) of the fabrication process according to the present disclosure.
Figure 2:
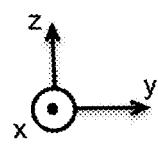

The fabrication process according to the present disclosure then comprises a step b) of forming an optical waveguide 50 extending in the main plane (x, y) and comprising a core 52, 52' formed in the surface layer 4 and encircled by an optical confinement layer 53 including the dielectric layer 3 (FIG. 2).

The formation of the optical waveguide 50 requires the surface layer 4 to be etched locally, so as to define the dimensions and the shape of the guide in the main plane (x, y).

FIGS. 4A and 4B illustrate two different architectures of the waveguide 50, in the case of a Mach-Zehnder interferometer and in the case of a ring resonator, seen from above, i.e., in the main plane (x, y), respectively. The core 52, 52' of the waveguide 50, one or more segments 52' of which are located plumb with the one or more cavities 2 (dashed lines in FIGS. 4A and 4B) may be seen therein. The length of the core 52 in the main plane (x, y) may vary depending on the targeted architecture. The width of the core 52 is conventionally between 0.2 and 1 micron, and preferably between 0.3 and 0.6 microns.

The formation of the optical waveguide 50 also requires an additional dielectric layer 3' to be deposited, on the core 52, 52', so as to encapsulate the latter in a cladding, here called the optical confinement layer 53, including the dielectric layer 3 of the SOI substrate 10. The additional dielectric layer 3' is preferably made of silicon oxide. Its thickness is typically between 0.5 and 1.5 microns.

In step b), advantageously after the waveguide 50 has been formed, an aperture (not shown) may be produced, through the optical waveguide 50, in order to place the at least one cavity 2 under an exterior pressure. The aperture is typically produced through the confinement layer 53, outside the region comprising the silicon core 52, 52'. This aperture will possibly be preserved, or be plugged to seal the cavity 2 after this placement under exterior pressure.

In the case where the buried cavity 2 is filled with a sacrificial material, (at least) one aperture is formed so as to allow the material to be accessed and a, wet or dry, etch aiming to remove the material and to empty the buried cavity 2 of its solid material to be carried out. Once again, the aperture will possibly be preserved or plugged after the cavity 2 has been emptied.

It will be recalled that the cavity 2 is hermetically sealed at the end of step a) and may, in certain embodiments, remain in this state in steps b) and/or c), or even after fabrication of the thermo-optic component, during use thereof. The hermetic character of the cavity 2 makes it possible to avoid effects due to unwanted penetration of gaseous or liquid species into this cavity 2 during the fabrication process, these effects potentially generating problems with drying, bonding of the upper membrane, various types of contamination, degradation of the upper membrane, etc. Keeping the cavity 2 hermetic during use of the component may also allow the reproducibility of the operating point (especially in terms of thermal environment and mechanical deformation) to be ensured.

Figure 3:
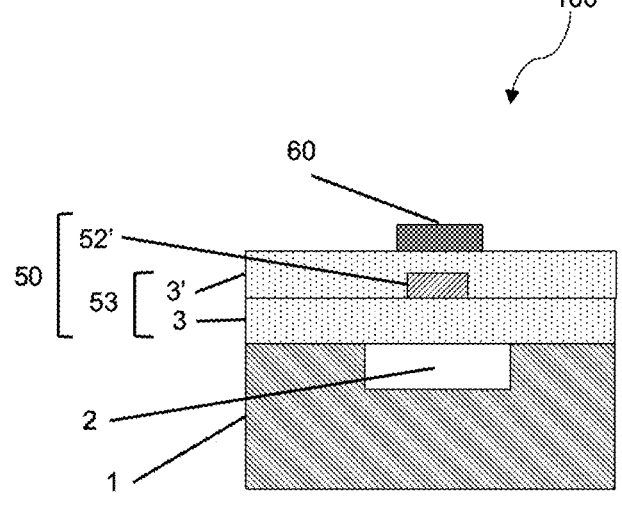
FIG. 3 shows step c) of the fabrication process according to the present disclosure.
Figure 3:
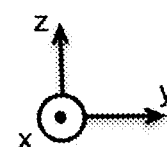

The fabrication process then comprises a step c) of producing at least one heating element 60, on the optical waveguide 50 (FIG. 3). This heating element 60 is placed, in the main plane (x, y) plumb with the buried cavity 2. Advantageously, the dimensions in this plane of the heating element 60 are smaller than those of the cavity 2, as illustrated in FIGS. 3, 4A and 4B.

Thus, again in the main plane (x, y), the heating element 60 is positioned either plumb with the core segment 52' of the optical waveguide 50, or on either side of the segment 52' (FIGS. 4A, 4B). This segment 52' corresponds to the portion of the waveguide 50 that will undergo the temperature variations applied by the heating element 60, and that will therefore endow the component 100 with its thermo-optic properties.

According to one particular exemplary embodiment, the heating element 60 is formed by depositing a Ti/TiN stack directly on the confinement layer 53, plumb with the segment 52' of the waveguide. The stack may have a thickness of about 100 nm.

The heating element 60 further comprises two metal contact pads, which are intended to be connected to a current source. When a current is applied, the heating element 60 dissipates heat via Joule heating and thus increases the temperature experienced by the core segment 52' of the waveguide 50.

The fabrication process according to the present disclosure is simple and effective: it limits the technological steps required to define and insulate the thermo-optic component 100, which steps are especially based on chemical etches that are often difficult to control; it also allows a high integration density to be achieved. The presence of (at least) one buried cavity 2 in the SOI substrate 10 facilitates the thermal insulation of the waveguide segment 52' intended to generate the thermo-optic effect, this allowing thermal losses via conduction to be limited, the air or gas in the cavity forming an excellent insulator. In parallel, the thermal continuity of the optical confinement layer 53 around the core 52 of the optical waveguide 50 ensures a low transient response time during the temperature variations of the heating element 60, thus endowing the component 100 with a very good responsiveness. The presence of the dielectric layer 3 under the core 52' of the optical waveguide allows a good compromise to be obtained between component response speed and the energy efficiency of the control thereof.

The fabrication process according to the present disclosure further procures thermo-optic components 100 that are robust because complex etches via the front side or via the back side of the SOI substrate 10 are not required to form the insulation, these etches being liable to decrease the mechanical strength of the component.

Needless to say, the present disclosure is not limited to the embodiments described and variant embodiments may be employed without departing from the scope of the invention as defined by the claims.

The invention claimed is:

1. A method of forming a thermo-optic component, the method comprising:

providing a silicon-on-insulator (SOI) substrate including:

a single-crystal silicon surface layer extending in a
main plane;

a dielectric layer; and a carrier substrate, wherein the dielectric layer is dis-
posed between the single-crystal silicon surface
layer and the carrier substrate, a surface of the carrier
substrate defining at least one cavity extending into
the carrier substrate adjacent the dielectric layer;

forming an optical waveguide extending in the main plane
and comprising a core in the single-crystal silicon
surface layer, the optical waveguide surrounded by an
optical confinement layer comprising the dielectric
layer; and forming at least one heating element proximate the optical
waveguide, the at least one heating element positioned,
relative to the main plane, plumb with a segment of the
optical waveguide, or on either side of the segment of
the optical waveguide, the at least one heating element
and the segment of the optical waveguide located
plumb with the at least one cavity;

after providing the SOI substrate including the single-
crystal silicon surface layer, the dielectric layer, and the
carrier substate with the surface of the carrier substrate
defining at least one cavity, forming an aperture
through the SOI substrate, the aperture extending to the
at least one cavity; and altering a pressure within the at least one cavity.

2. The method of claim 1, further comprising plugging the
aperture to hermetically seal the at least one cavity with the
altered pressure therein.

8

3. The method of claim 1, wherein the at least one cavity
is hermetically sealed while forming the optical waveguide
and forming the at least one heating element.

4. The method of claim 1, wherein the dielectric layer
comprises silicon oxide and has a thickness between 100 nm
and 3 microns.

5. The method of claim 1, further comprising forming the
surface layer to have a thickness between 100 nm and 500
nm.

6. The method of claim 1, wherein forming the optical
waveguide comprises forming an additional dielectric layer
defining part of the optical confinement layer, the additional
dielectric layer having a thickness between 0.5 and 1.5
microns.

7. The method of claim 1, further comprising forming the
at least one cavity to have lateral dimensions, in the main
plane, between 10 microns and three millimeters, and a
depth, along an axis normal to the main plane, between three
microns and 100 microns.

8. The method of claim 7, further comprising forming the
at least one cavity to have a depth between 5 and 10 microns.

9. A method of forming a thermo-optic component, com-
prising:

forming at least one thermo-optic component according to
a method as recited in claim 1; and forming a switch, a phase-shifter, a modulator, a laser
emitter, an amplifier, a directional coupler, a filter
and/or a multiplexer using the at least one thermo-optic
component.

* * * * *